Patented Sept. 13, 1932

1,877,303

UNITED STATES PATENT OFFICE

ERNEST F. GRETHER, OF MIDLAND, MICHIGAN, ASSIGNOR TO THE DOW CHEMICAL COMPANY, OF MIDLAND, MICHIGAN, A CORPORATION OF MICHIGAN

AZO ARYLIDES OF 2.3 HYDROXY-NAPHTHOIC ACID AND AZO DYESTUFFS DERIVED THEREFROM

No Drawing.   Application filed April 27, 1929.   Serial No. 358,756.

The invention relates to direct developed azo dyestuffs of the type wherein an arylide of 2.3-hydroxy naphthoic acid is coupled with a diazotized arylamine, and has regard particularly to a new sub-class of the above general character but distinguished from those hitherto known in that the aforesaid arylide component thereof is formed by condensing an amino-azo compound, instead of a simple arylamine, with 2.3-hydro-naphthoic acid. That is to say, the dyestuffs of the present invention are to be denoted as the coupled product of diazotized or tetrazotized arylamines and azo-arylides of 2.3-hydro-naphthoic acid. They accordingly have the structure of disazo or polyazo compounds, which is illustrated by the following general formula, representing such disazo compound;

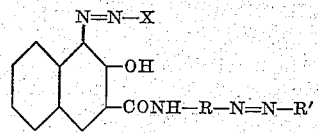

in which R, R' and X, respectively, are aryl residues which may be further substituted.

It is well known that direct azo dyes fast to light and washing are produced by coupling arylides of 2.3-hydroxy-naphthoic acid with diazotized or tetrazotized arylamines, as is evidenced by the large number of issued patents bearing on the subject. I have discovered, however, that, when azo-arylides of 2.3-hydroxy-naphthoic acid are so coupled, the dyestuffs produced possess even greater fastness and the colors developed are notably deeper in tone. The invention, then, consists of the new intermediate compounds, viz., azo-arylides of 2.3-hydroxy-naphthoic acid, and azo dyestuffs derived therefrom, together with the methods for the preparation thereof as hereinafter fully described and particularly pointed out in the claims, the following description setting forth certain procedure representative of various ways in which the principle of the invention may be practiced.

The herein described new dyestuffs dye cotton and other fibres directly in a wide range of colors varying from orange to deep blue and black and in remarkably clear and brilliant tones. They are best applied by developing on the fibre, but may also be produced in substance per se or deposited upon suitable substrata to form lakes, in which forms they are useful pigments on account of their insolubility, stability and fastness.

A preferred manner in which the invention may be carried out is illustrated in the following specific examples, it being understood, however, that such examples are not to be construed as a limitation upon the invention.

*Example 1*

The benzene azo-arylide of 2.3-hydroxy-naphthoic acid is prepared by heating a mixture consisting of 20 parts amino-azo-benzene, 20 parts 2.3-hydroxy-naphthoic acid and 6 parts phosphorus trichloride dissolved or suspended in 150 parts toluene under reflux for 3 to 5 hours. Sodium carbonate is then added and the toluene is removed by distilling with steam. The aqueous residue containing the azo-arylide product in suspension therein is filtered, and the precipitate is washed with water. The product is then purified by dissolving in dilute, 1 to 2 per cent, caustic alkali solution, filtering from unreacted amino-azo-benzene, and precipitating by acidification of the alkaline solution.

Cotton yarn is padded with a slightly alkaline solution of the above azo-arylide to which may be added advantageously, but not necessarily, formaldehyde and a fixative, such as Turkey red oil or an aluminum salt. The material is then dipped in a cold solution of sodium acetate or carbonate, and the dye is developed by adding a diazo solution derived from meta-nitraniline. The color developed is a clear, deep orange. The dyestuff has the formula;

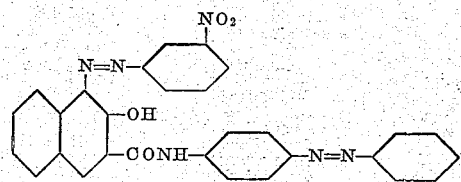

Example 2

By similar procedure as described in Example 1 the para-nitro-benzene-azo-toluidide of 2.3-hydroxy-naphthoic acid is prepared by coupling para-nitraniline with ortho-toluidine and condensing the resultant amino-azo compound with 2.3-hydroxy-naphthoic acid. The dye is developed by treatment with the diazo solution from ortho-amino-diphenyl ether. The color is a bright carmine red. The dyestuff has the formula;

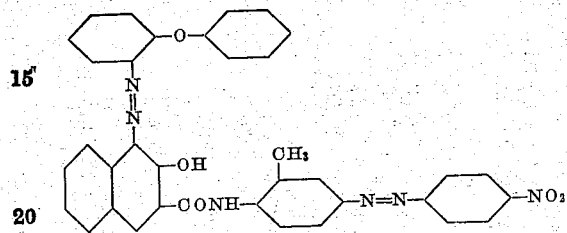

Example 3

Aniline is diazotized and coupled with β-naphthyl-amine, and the amino-azo compound is condensed with 2.3-hydroxy-naphthoic acid. The dye is developed by treatment with the diazo solution from α-naphthyl-amine. The color is a deep shade of red violet. The dyestuff has the formula;

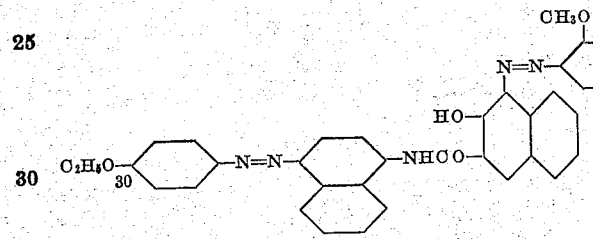

Example 4

Aniline is diazotized and coupled with α-naphthylamine and the product condensed with 2.3-hydroxy-naphthoic acid. The dye is developed by treatment with the diazo solution from 3,4-dichlor-aniline. The color is a brilliant scarlet. The dyestuff has the formula;

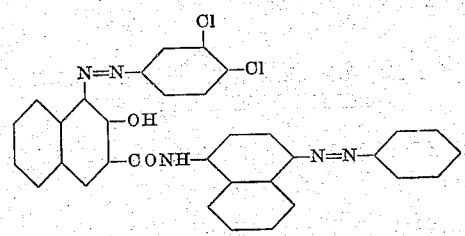

Example 5

Para-phenetidine is diazotized and coupled with α-naphthyl-amine, the product condensed with 2.3-hydroxy-naphthoic acid and the dye developed by treatment of the azo-arylide so formed with the tetrazo solution of dianisidine. The color is a deep blue without violet shading. The formula;

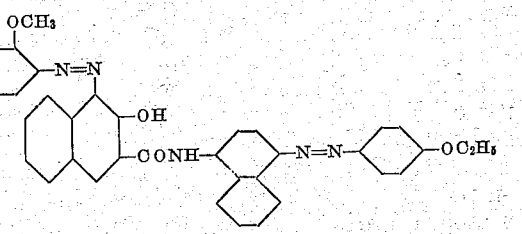

Example 6

Meta-nitraniline is diazotized and coupled with α-naphthyl-amine, the product condensed with 2.3-hydroxy-naphthoic acid, and the resultant azo-arylide coupled with diazotized para-amino-acetanilide. The color is a clear bordeaux. The formula;

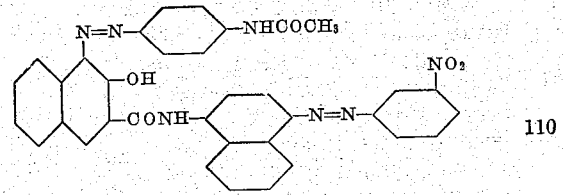

In addition to the foregoing representative examples, a very large number of other dyeings have been made by the same general method, several of which are listed in the appended table.

| 2.3-hydroxy-naphthoic acid arylide from | | Coupled with diazotized arylamine | Color |
|---|---|---|---|
| diazotized amine | +arylamine | | |
| aniline | aniline | 2-chlor-4-nitraniline | Orange red |
| aniline | aniline | dianisidine | Dark violet |
| aniline | aniline | benzene-azo-β-naphthyl-amine | Carmine |
| aniline | aniline | 4-nitro-benzene-azo-2-toluidine | Red brown |
| 4-nitraniline | 2-toluidine | 4-amino-acetanilide | Mulberry |
| 4-nitraniline | 2-toluidine | α-naphthylamine | Red violet |
| 4-nitraniline | 2-toluidine | amino-naphthyl-phenyl-ether | Blue violet |
| 4-nitraniline | 2-toluidine | 3-nitraniline | Orange |
| aniline | β-naphthylamine | 3, 4 dichloraniline | Ponceau |
| aniline | β-naphthylamine | 2-nitro-4-phenetidin | Red violet |
| aniline | β-naphthylamine | anthranilic acid | Red |
| aniline | β-naphthylamine | 2-amino-diphenyl | Scarlet |

| 2.3-hydroxy-naphthoic acid arylide from | | Coupled with diazotized arylamine | Color |
|---|---|---|---|
| diazotized amine | +arylamine | | |
| aniline | α-naphthylamine | 2-amino-diphenyl ether | Scarlet |
| aniline | α-naphthylamine | α-naphthylamine | Violet red |
| aniline | α-naphthylamine | 4, 4'-diamino-diphenyl ether | Ponceau |
| aniline | α-naphthylamine | 4-nitraniline | Orange red |
| 4-phenetidine | α-naphthylamine | 4-amino-acetanilide | Violet red |
| 4-phenetidine | α-naphthylamine | 2-amino-diphenyl | Eosin |
| 4-phenetidine | α-naphthylamine | amino-azo-benzene | Bordeaux |
| 4-phenetidine | α-naphthylamine | phenetol-azo-α-naphthylamine | Gray blue |
| 3-nitraniline | α-naphthylamine | amino-naphthyl phenyl ether | Blue violet |
| 3-nitraniline | α-naphthylamine | 4, 4'-diamino-diphenyl ether | Rose |
| 3-nitraniline | α-naphthylamine | 3-nitraniline | Orange |
| 3-nitraniline | α-naphthylamine | 3-nitrobenzene-azo-α-naphthylamine | Black |

While in the detailed Example 1 the cotton fibre has been specifically referred to as the material to be dyed with the herein described new dyestuffs, other natural or synthetic textile fibres may likewise be dyed therewith, such as silk or rayon or the like. It is immaterial as regards the novelty of my invention whether the dye is applied by developing on the fibre or prepared in substance for use as a pigment. Mordanting or other auxiliary treatments for promoting the absorption of the dye by the fibre, or after-treatment with metallic salts, e. g. chromium, copper or aluminum salts, for fixing the dye or modifying its color tone may be optionally employed without departing from the spirit of my invention, which is intended to include not only the dyestuffs of the general type herein described, but also material dyed therewith.

In the following claims it is understood that the invention comprehends the coupling of the herein described azoarylides of 2.3-hydroxy-naphthoic acid equally with diazotized or tetrazotized arylamines, as well as the azo-dyestuffs derived therefrom.

Other modes of applying the principle of my invention may be employed instead of the one explained, change being made as regards the materials employed, provided the ingredients stated by any of the following claims or the equivalent of such stated ingredients be employed.

I therefore particularly point out and distinctly claim as my invention :—

1. The method of making an azo dye which comprises coupling a diazotized aromatic amino compound with an azo-arylide of 2.3-hydroxynaphthoic acid having the general formula;

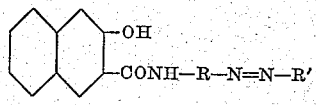

wherein R and R' represent nuclei of the benzene or naphthalene series which may also bear substituents of the class consisting of nitro, alkyl, and alkoxy groups.

2. The method of making an azo dye which comprises condensing an amino-azo compound with 2.3-hydroxynaphthoic acid to produce an azo-arylide having the general formula;

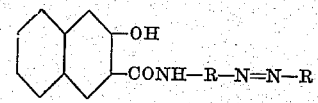

wherein R and R' represent nuclei of the benzene or naphthalene series which may also bear substituents of the class consisting of nitro, alkyl, and alkoxy groups, and then coupling such azo-arylide with a diazotized aromatic amino compound.

3. As a new product, an azo dye having the general formula;

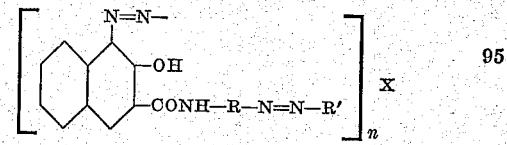

wherein R and R' represent nuclei of the benzene or naphthalene series which may also bear substituents of the class consisting of nitro, alkyl, and alkoxy groups, X represents the residue of a diazotized aromatic amino compound, and n is the number of diazo groups in such diazotized aromatic amino compound.

4. As a new product, an azo dye having the general formula;

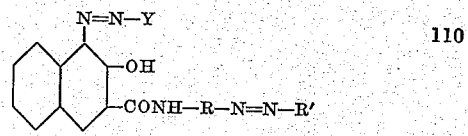

wherein R and R' represent nuclei of the benzene or naphthalene series which may also bear substituents of the class consisting of nitro, alkyl and alkoxy groups and wherein Y represents a residue of a diazotized aromatic amino compound.

Signed by me this 20 day of April, 1929.
ERNEST F. GRETHER.